United States Patent [19]

King

[11] Patent Number: 4,970,492

[45] Date of Patent: Nov. 13, 1990

[54] METHOD AND APPARATUS FOR DETERMINING EXCESSIVE ENGINE OIL USAGE

[75] Inventor: Edward T. King, Dearborn, Mich.

[73] Assignee: Ford Motor Company, Dearborn, Mich.

[21] Appl. No.: 476,861

[22] Filed: Feb. 8, 1990

[51] Int. Cl.$^5$ .............................................. B60Q 1/00
[52] U.S. Cl. ................................ 340/450.3; 340/438; 340/439; 340/462; 364/424.03; 364/551.01; 123/196 S
[58] Field of Search ...................... 340/450.3, 438, 439, 340/462; 364/431.01, 424.03, 424.04, 550, 569, 551.01; 123/196 S, 196 R

[56] References Cited

U.S. PATENT DOCUMENTS

| | | | |
|---|---|---|---|
| 3,526,127 | 9/1970 | Sarkis | 73/64 |
| 3,593,012 | 7/1971 | Lang | 235/193 |
| 4,277,772 | 7/1981 | Kastura et al. | 340/52 F |
| 4,497,200 | 2/1985 | Tournier | 73/64 |
| 4,506,337 | 3/1985 | Yasuhara | 364/550 |
| 4,525,782 | 6/1985 | Wohlfarth et al. | 364/431.01 |
| 4,533,900 | 8/1985 | Muhlberger et al. | 340/52 R |
| 4,677,847 | 7/1987 | Sawatari et al. | 73/64 |
| 4,694,793 | 9/1987 | Kawakita et al. | 123/196 S |
| 4,706,193 | 11/1987 | Imajo et al. | 364/424 |
| 4,733,556 | 3/1988 | Meitzler et al. | 73/64 |
| 4,741,200 | 5/1988 | Hammerle | 73/54 |
| 4,742,476 | 5/1988 | Schwartz et al. | 364/550 |
| 4,839,831 | 6/1989 | Imago et al. | 364/550 |

*Primary Examiner*—Donnie L. Crosland
*Attorney, Agent, or Firm*—Paul K. Godwin, Jr.; Clifford L. Sadler

[57] ABSTRACT

An engine oil condition sensor which measures oil temperature and the time the engine has been in operation since the last oil change. The sensor determines when the amount of "cold" engine operation exceeds a predetermined portion of the total engine operation in order to warn the operator to change engine operation patterns by providing more operation time at warmer temperatures. The sensor also accumulates the actual time the oil has been in the engine and the time the engine has been operated at elevated "hot" temperatures. Whenever any accumulation exceeds predetermined threshold levels, appropriate warnings are given to the operator.

15 Claims, 4 Drawing Sheets

METHOD AND APPARATUS FOR DETERMINING EXCESSIVE ENGINE OIL USAGE

FIELD OF THE INVENTION

The present invention is directed to the field of engine oil wear sensing systems and more specifically to the methods and apparatus used to infer engine oil wear by measuring engine usage parameters.

BACKGROUND OF THE INVENTION

Several attempts have been made to provide onboard indicators for the purpose of notifying an operator that the lubricating oil of an associated internal combustion engine is in need of being replaced.

For instance, U.S. Pat. Nos. 4,733,556 and 4,741,200 describe the use of sensors which directly measure various properties of lubricating oil and provide indications of when those properties change beyond predetermined limits.

Other systems have been described in which particular engine operating parameters are determined as being key to the effects of oil degradation and wear. Several patents, including the following, describe techniques for measuring operating parameters and inferring oil degradation based upon such measurements.

U.S. Pat. No. 4,506,337 teaches that soot suspended in lubricating oil is associated with its degradation and the amount of soot in the oil is strictly dependent on the number of engine revolutions, load, EGR rate. That patent presents a system for providing driver notification of the need to replace lubricating oil based upon a soot calculation algorithm in response to parameter inputs from an engine speed sensor and an engine load sensor.

U.S. Pat. No. 4,694,793 describes a system that senses the alkalinity and the oil level within the lubricating oil sump of an internal combustion engine. It is said that the reaction between alkaline content and metal contaminants in the oil increase with elevated temperature. Engine speed and temperature are used to predict the affect on the longevity of the oil from the standpoint of infusible matter contamination.

U.S. Pat. No. 4,525,782 describes a system that senses the lubricating oil condition indirectly by monitoring fuel consumption. In that patent a value corresponding to a specific quantity of fuel consumption is stored as a reference, and oil wear is determined as a function of the difference between the actual fuel consumed and the stored value.

U.S. Pat. No. 4,533,900 discloses a system that measures lubricating oil temperature, engine speed, and a rate of fuel consumption. It also measures distance traveled by the vehicle. In that system, a service warning is displayed after a predetermined distance has been traveled, wherein the distance is composed of the actual distance traveled and an additional engine loading component calculated as a function of the load on the engine.

U.S. Pat. No. 4,677,847 teaches a system that monitors the engine running time, the oil temperature and the engine speed to determine the rate of deterioration of lubricating oil. It provides a continuous output signal that represents the remaining useful life of the oil when desired by the driver. That system estimates a time in the future when the oil will reach undesirable deterioration levels. The time prediction is displayed as mileage remaining before the oil change is required.

U.S. Pat. No. 4,742,476 describes an automatic engine oil change indicator system in which only the engine oil temperature and engine speed are sensed to determine the wear life of lubricating oil in an internal combustion engine. An effective oil usage amount is periodically computed by multiplying accumulated engine revolutions (actual measured revolutions during the period) by a penalty factor which is determined as a sole function of the engine oil temperature as it relates to empirically determined data without regard to the engine load. Oil change indication is also provided by a one year clock or a 7,500 mile limit between changes.

U.S. Pat. No. 4,706,193 describes a system which senses the distance traveled by a vehicle, the temperature of the lubricating oil, the speed the engine is operating and the type of oil used. All sensor outputs are multiplied by weighted coefficients. They are added and that sum is integrated over time. When the integrated value exceeds a predetermined level, a warning signal is given to the driver. The described system also adjusts the predetermined level whenever oil is sensed as being added to that which is already present.

U.S. Pat. No. 4,497,200 discloses an engine oil evaluation indicator. The indicator includes an analog circuit which provides three currents that are summed and then integrated by an electrolytic integrating device. The three currents are proportionally provided to represent a temperature variation either below or above a satisfactory temperature, the idle periods of the engine and the utilization periods of the engine. When the integral of the sum reaches the maximum capacity of the device, a threshold detector senses the corresponding voltage increase across the device and warns the user that the oil must be replaced.

SUMMARY OF THE INVENTION

The present invention relates in general to an electronic indicator for motor vehicles which functions to alert the operator to either change the lubricating oil or to change the engine operating patterns and thereby avoid premature deterioration of the oil. The present invention may be either a stand-alone device or integrated into existing microprocessor equipped engine control systems. Such a system provides a reliable indication of required oil change or operation pattern changes according to empirically determined oil wear data. The system measures values of oil temperature, hours of engine operation and time the oil has remained in the engine since the lost oil change.

During the development of specialized lubricants for methanol-fueled engines it was discovered that a high percentage of low temperature operation of such engines led to crank case oil dilution with water and unburned methanol. Such a mixture increases the potential for accelerated engine wear. Fast engine warm-up and operation of the engine in a warmed condition minimizes the operating time below the boiling point of methanol (149° F.). Such operation patterns were found to minimize wear due to oil contamination. Accordingly, the present invention not only monitors the time the engine is operating below that temperature but also determines the percentage of operating time since the last oil change that the engine is operated below that temperature. This determination is used in order to notify the operator when low temperature operation constitutes too high a percentage of the operating time.

The operator then is warned to change the operation patterns so that more operation time occurs at the higher temperatures.

It is an object of the present invention to provide a method and apparatus for determining when the lubricating oil in an internal combustion engine has been excessively used at low temperatures.

It is another object of the present invention to provide a method and apparatus for determining when the lubricating oil in an internal combustion engine has been used to a point that the oil requires changing.

It is a further object of the present invention to provide a method and apparatus which infers the condition of oil by measuring the operating temperature of the oil, the time the oil has remained in the engine since the last oil change and time the engine has been in operation since the last oil change.

DETAILED DESCRIPTION OF THE PREFERRED EMBODIMENT

Figure 1:
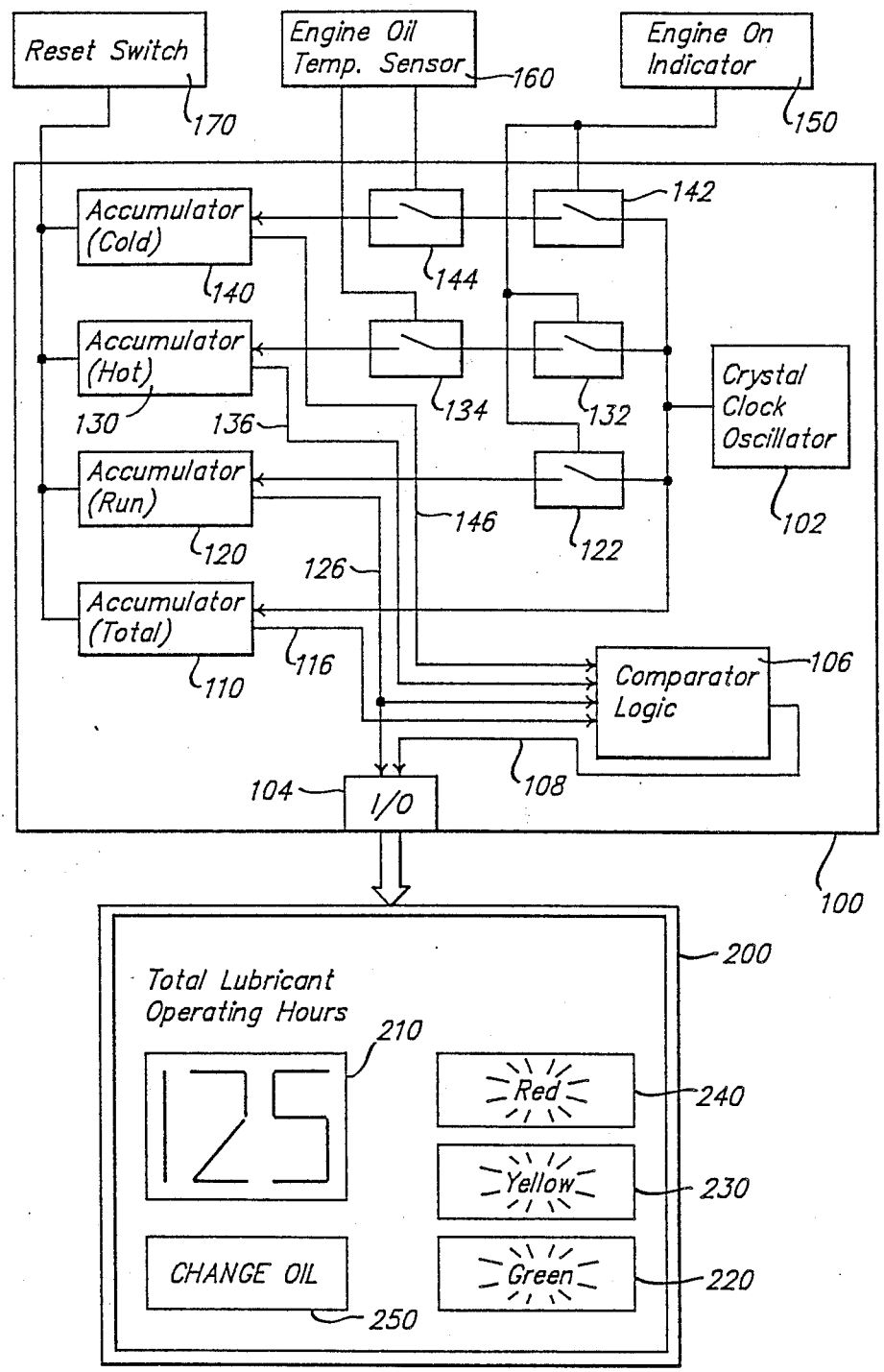
FIG. 1 is a block diagram representation of a microprocessor-based apparatus of the present invention.

In FIG. 1 a microprocessor 100 is designated as having inputs from an engine-on indicator 150, an engine oil temperature sensor 160, and a reset switch 170. The microprocessor 100 is connected to a monitoring display device 200 which provides specific indicators to the engine operator regarding engine oil condition.

In the microprocessor 100, a clock oscillator 102 is used to provide timing pulses to the system even when the associated engine is not in operation. The output of the clock oscillator 102 is fed to an accumulator 110 which measures the time the lubricating oil has been in the engine since the last oil change (last reset). In order for the system to operate properly, the reset switch 170 is activated whenever the lubricating oil is replaced.

Accumulators 120, 130 and 140 are also shown as being connected to the reset switch 170, in parallel with the accumulator 110.

A gate switch 122 is represented between the clock oscillator 102 and the input of the accumulator 120. The gate switch 122 provides a closed path for the pulses from the clock oscillator 102 when the engine-on indicator 150 provides an enabling signal to indicate that the engine is in operation (running). Therefore, accumulator 120 measures the amount of time the engine has been in operation since the last oil change (last reset).

A pair of gate switches 132 and 134 are represented as being in series between the output of the clock oscillator 102 and the input of the accumulator 130. Gate switch 132 is connected to receive the signal from the engine-on indicator 150 and to provide a closed path for the pulses from the clock oscillator 102 to the input of the gate switch 134 when the engine is in operation. The gate switch 134 is connected to receive an output of the engine oil temperature sensor 160 and to provide a closed path for the clock pulses when the temperature of the engine oil is sensed as being above a predetermined high reference temperature. The high reference temperature corresponds to the upper end of the normal range for engine operation. In the case of the methanol fueled engines, the high reference temperature was determined to be 265° F. When the engine is in operation and the temperature of the oil is above 265° F., gate switches 132 and 134 provide a closed path to supply clock pulses from the clock oscillator 102 to the input of the accumulator 130. Therefore, the accumulator 130 measures the amount of time the engine has been in operation above a high reference temperature since the last oil change.

Gate switches 142 and 144 are connected in series between the clock oscillator 102 and the accumulator 140. The gate switch 142 is connected to receive the output of the engine-on indicator 150 and to provide a closed path for the pulses from the clock oscillator 102 when the engine is in operation. Gate switch 144 provides a closed path for the clock pulses exiting gate switch 142 when the output of the engine oil sensor 160 indicates that the engine oil temperature is below a predetermined low reference temperature. The low reference temperature corresponds to the lower end of the normal range of engine operation. In the case of the methanol-fueled engines, the low reference temperature was determined to be 149° F. When the engine is in operation below 149° F., the gate switches 142 and 144 provide a closed path to supply clock pulses from the clock oscillator 102 to the input of accumulator 140. Therefore, the accumulator 140 measures the amount of time the engine has been in operation below a low reference temperature since the last oil change.

The output lines 116, 126, 136 and 146 of the respective accumulators 110, 120, 130 and 140 are fed to a comparator logic 106 where various determinations are made. For instance, the ratio of cold temperature operation time to overall engine operation time is determined. Several individual accumulator values exceeding predetermined thresholds are determined by comparator logic 106. Each determination is coded onto line 108 to I/O port 104 for transmission to the display device 200. The display device 200 receives and decodes the information from I/O port 104 and provides the appropriate indicators to the engine operator.

Line 126 from accumulator 120 is also connected to I/O port 104 for direct input to display device 200. A digital read-out 210 provides an operating hours log that corresponds to the time measured in accumulator 120 of engine operation since the last oil change.

A "GREEN" indicator light 220 is activated when the percentage of time the engine has been operating in the cold temperature range is less than 10 percent of the entire time the engine has been in operation since the last oil change.

The "YELLOW" indicator light 230 is energized whenever it is necessary to indicate when the period of cold temperature operation has increased to at least 10% of the total time the engine has been in operation since the last oil change and less than 24%.

The CHANGE OIL indicator light 250 is energized in this case whenever the oil has been determined to have been in the engine for a period of approximately 95% of one (1) year; the engine has been operated for more than 120 hours since the last oil change; the engine has been operated in excess of the high reference temperature for more than 10 hours since the last oil change; the engine has been operated at temperatures below the low reference temperature for more than 30 hours since the last oil change; or the amount of engine operation time below the low reference temperature exceeds 24% of the overall operation time since the last oil change.

The RED indicator light 240 is used in conjunction with the change oil light 250 and is energized when the same oil has remained in the engine for more than one (1) year; the engine has been operated for more than 125 hours since the last oil change; or the amount of engine operation time below the low reference temperature exceeds 24% of the overall operation time since the last oil change.

Figure 2A:
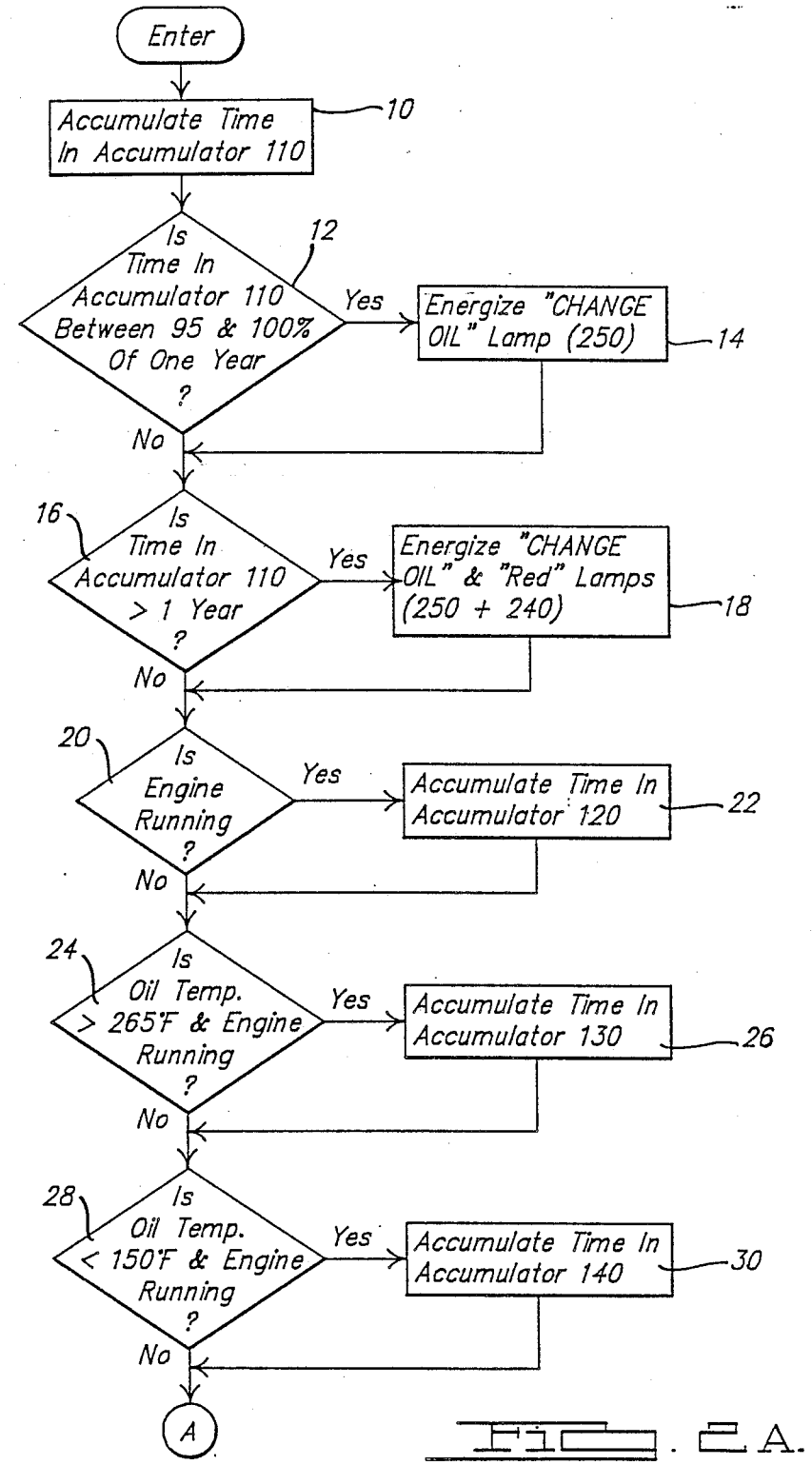
FIGS. 2A-2C constitute a flow diagram illustrating the method steps employed in the present invention.
Figure 2B:
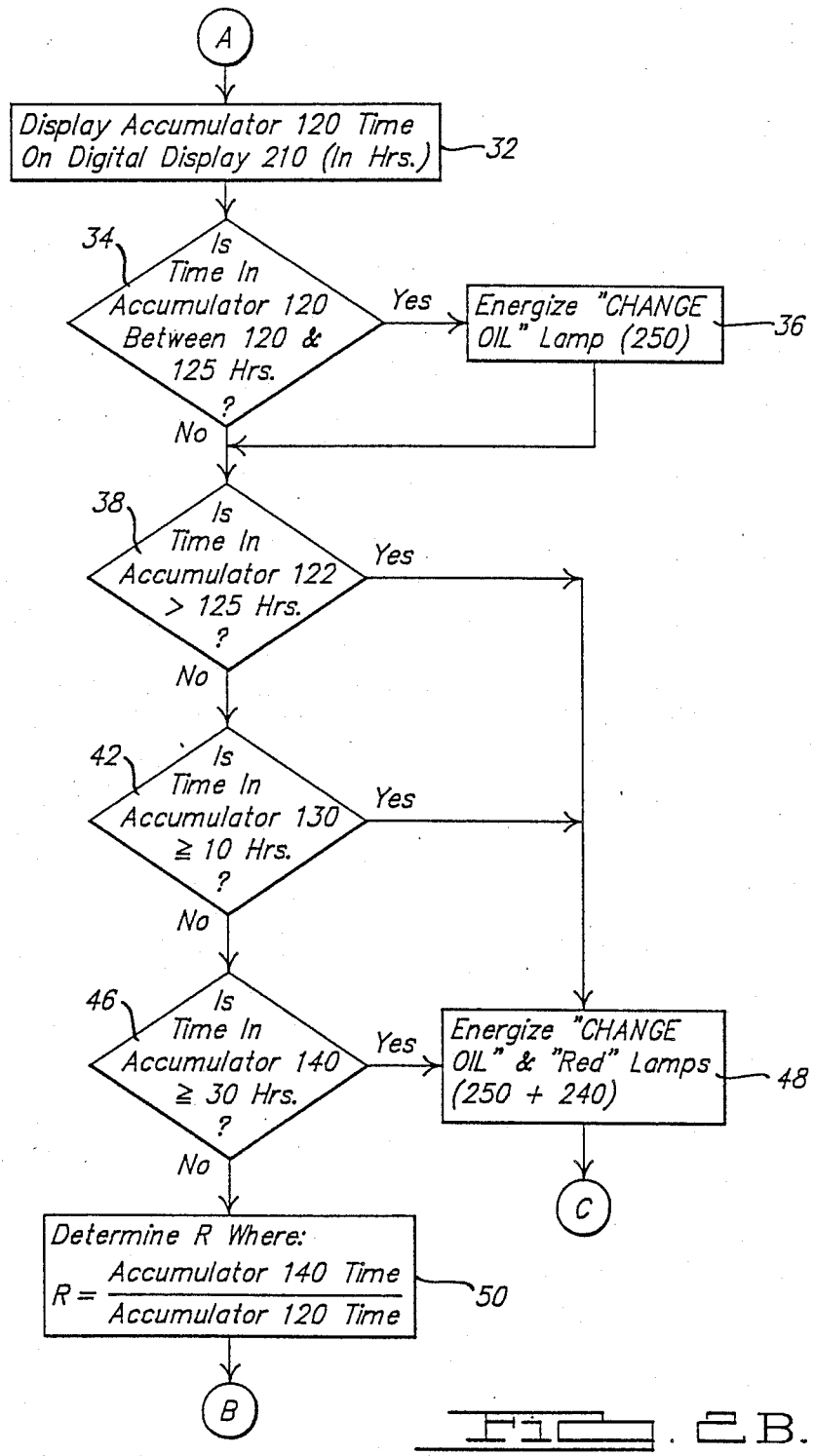
Figure 2C:
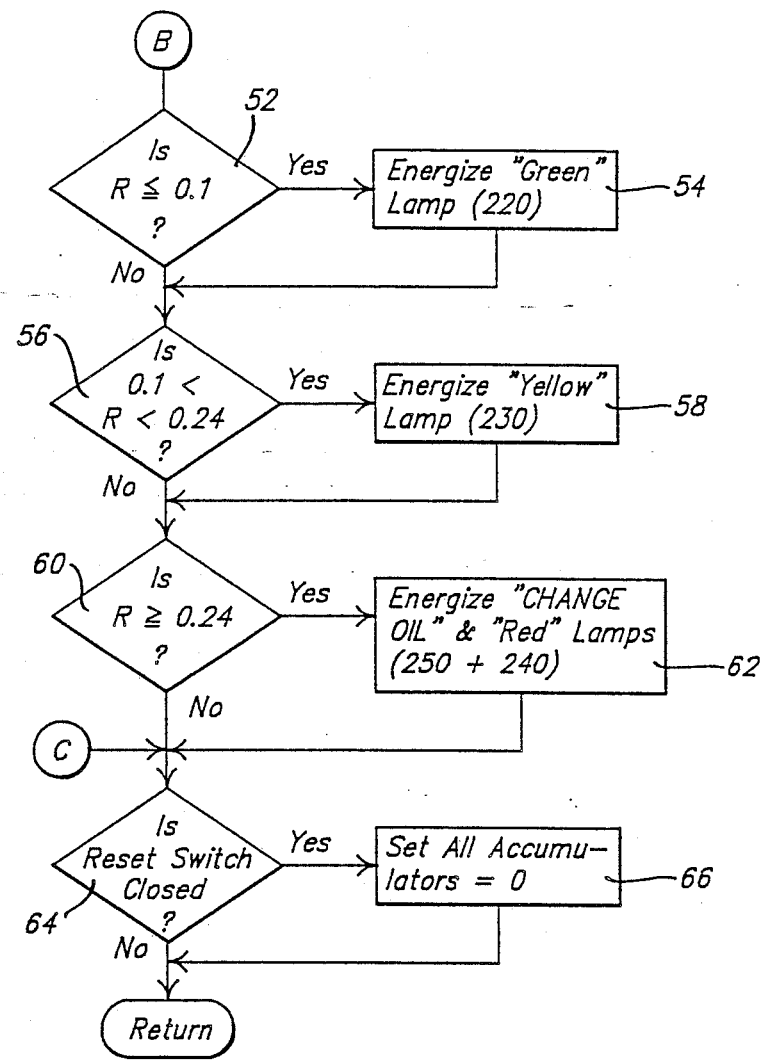

A microprocessor may be programmed in a manner as shown in FIGS. 2A–2C in order to determine the excessive use of the oil and energize the appropriate lamp(s) in the display 200. The steps that make up the program instructions commence with the accumulation of time in accumulator 110 in step 10 in order to accumulate the total time the lubricating oil has been in the engine since the last oil change. An inquiry is made in step 12 to determine if the value of time accumulated in accumulator 110 is between is 95% and 100% of one year. If a determination is made that the oil has been in the engine between 95% and 100% of one year, command 14 causes the CHANGE OIL indicator light 250 to be energized. If the time in the accumulator 110 is greater than 100% of one year, inquiry step 16 causes the CHANGE OIL indicator 250 and the RED indicator light 240 to both be energized in step 18. If the time in the accumulator 110 is determined to be less than 95% of one year in steps 12 and 16 (by default), inquiry step 20 is performed to determine if the engine is running (in operation). If the engine is running, step 22 commands the accumulator 120 to accumulate time corresponding to cumulative periods the engine has been in operation since the last oil change. A determination is made in step 24 as to whether or not the oil temperature is greater than the high reference temperature 265° F. and the engine is running. If the determination in step 24 is affirmative, step 26 causes time to be accumulated in the accumulator 130. Such accumulation will total the amount of time the engine has been run in a "hot" condition since the last oil change. In step 28 an inquiry is made to determine if the lubricating oil temperature is below the low reference temperature 150° F. and the engine is running. If the determination in step 28 is affirmative, step 30 causes the accumulator 140 to accumulate those time periods the engine has been in operation in a "cold" condition since the last oil change.

Step 32 orders the time value in accumulator 120 to be read and displayed on digital display 210 as the cumulative hours the engine has been in operation since the last oil change.

In step 34, an inquiry is made about the time value in accumulator 120 to determine if it is between 120 and 125 hours. If the inquiry in step 34 is affirmative, step 36 orders the CHANGE OIL indicator light 250 to be energized. In step 38, another inquiry is made to determine if the time value stored in accumulator 120 is greater than the 125 hours. If the determination in step 38 is affirmative, both the CHANGE OIL indicator light 250 and the RED indicator light 240 are energized in step 48. If not, an inquiry is made in step 42 to determine if the time value stored in accumulator 130 is greater than or equal to 10 hours. A determination of "hot" temperature operation of greater than or equal to 10 hours causes both the CHANGE OIL indicator light 250 and the RED indicator light 240 to be energized in step 48. If not, step 46 makes inquiry of the value stored in the "cold" operation accumulator 140 to determine if the time value stored therein is greater than or equal to 30 hours. If the value stored in the accumulator 140 is greater than or equal to 30 hours, both the CHANGE OIL indicator light 250 and the RED indicator light 240 are energized by step 48, the program advances to step 64. If the time in the accumulator 140 is determination step 46 to be less than 30 hours, step 50 determines the ratio "R" of cold operation time with respect to the engine run time by comparing the time value in accumulator 140 with the time value in accumulator 120. If "R" determined in step 50 is found in step 52 to be less than or equal to 0.1 (10%), step 54 is performed which causes the GREEN indicator light 220 to be energized. This indicates that the operating patterns of the engine are sufficient to purge the oil of the diluting contaminants.

Step 56 makes an inquiry of the value of R as being greater than 0.1 but less than 0.24. If R is between those elevated values, step 58 causes the YELLOW indicator light 230 to be energized. At this point, the operator is warned that the percentage of "cold" temperature operation patterns of the engine are becoming unacceptable. Continuation of such patterns may cause the oil to be diluted and less effective because of water condensation or fuel that has not been purged by operating the engine for prolonged periods at temperatures above the low reference temperature.

Step 60 determines if R is greater than or equal to 0.24. If so, both the CHANGE OIL indicator light 250 and the RED indicator light 240 are energized in step 62. This is an urgent warning to the operator that will remain energized until the oil is changed.

Inquiry step 64 determines if the reset switch is closed. If the reset switch is closed as it should be for a short period of time following replacement of the engine oil, all the accumulators are reset to zero in step 66. If, on the other hand, the reset switch is opened, the program returns to the beginning.

It will be apparent that many modifications and variations may be implemented without departing from the scope of the novel concept of this invention. Therefore, it is intended by the appended claims to cover all such modifications and variations which fall within the true spirit and scope of the invention.

I claim:

1. A method of determining when the lubricating oil in an internal combustion engine has been excessively used at low temperatures, comprising the steps of:
    accumulating the time the engine has been in operation since the last oil change;
    sensing the temperature of the oil when said engine is in operation;
    accumulating the time the engine has been in operation at temperatures below a predetermined temperature since the last oil change;
    periodically comparing the accumulated temperature operation time with the accumulated engine operation time; and
    notifying an engine operator whenever the engine is sensed to have been in operation below said predetermined temperature for a period of time that is above a predetermined percentage of said engine operation time.

2. A method of determining when the lubricating oil in an internal combustion engine has been excessively used at low temperatures, comprising the steps of:
    accumulating the actual time the most recently changed oil has remained in the engine;
    accumulating the time the engine has been operated since the last oil change;

sensing the temperature of the oil when said engine is in operation;

accumulating the time the engine has been sensed as having been in operation since the last oil change at temperatures that are below a predetermined temperature;

comparing the engine operation time accumulation below the predetermined temperature with the engine operation time accumulation;

notifying an engine operator whenever the actual time the oil remains in the engine exceeds a first predetermined period of time, whenever the engine operation time exceeds a second predetermined period of time that is less than first predetermined period of time, and notifying said engine operator whenever the comparing step indicates that the engine has been operated below the predetermined temperature for at least a predetermined percentage of its operation time accumulation since the last oil change.

3. A method of determining when the lubricating oil in an internal combustion engine has been used to a point that it requires replacement, comprising the steps of:

providing a means for accumulating the actual time the oil remains in the engine;

providing a means for accumulating the time the engine is in operation;

providing a means for sensing the temperature of the oil when said engine is in operation;

providing a means connected to said sensing means for accumulating the time the engine is in operation at a temperature that is outside a predetermined range of temperatures;

providing a means for notifying an engine operator whenever the actual time the oil remains in the engine exceeds a first predetermined period of time, whenever the engine operation time accumulation exceeds a second predetermined period of time that is less than first predetermined period of time, and whenever the engine is sensed to have been in operation outside said predetermined range of temperatures for a third accumulated period of time that is less than said first and second predetermined periods of time.

4. A method of determining when the lubricating oil in an internal combustion engine has been used to a point that the oil requires changing, comprising the steps of:

providing a first resettable means for accumulating the time the oil remains in the engine between oil changes;

providing a second resettable means for accumulating the time the engine is in operation between oil changes;

providing a means for sensing the temperature of the oil when said engine is in operation;

providing a third resettable means connected to said sensing means for accumulating the time the engine is in operation between oil changes at temperatures that are outside a predetermined range of temperatures;

providing a means for notifying an engine operator whenever the actual time the oil remains in the engine exceeds a first predetermined period of time, whenever the engine operation time accumulation exceeds a second predetermined period of time that is less than first predetermined period of time, and whenever the engine is sensed to have been operated outside said predetermined range of temperatures for a third accumulated period of time that is less than said first and second predetermined periods of time.

5. A method as in claim 4, wherein said first, second and third means are reset to predetermined initial values when said oil is changed.

6. A method as in claim 5, further including the step of providing a means for comparing the accumulated time in said third means with the accumulated time in said second means, and said notifying means also functions whenever the comparing means indicates that the engine has been operated outside the predetermined range of temperatures for at least a predetermined percentage of its accumulated operation time since the last oil change.

7. An apparatus for determining when the lubricating oil in an internal combustion engine has been used to a point that it requires replacement, comprising:

means for accumulating the actual time the oil remains in the engine between oil changes;

means for accumulating the time the engine is in operation between oil changes;

means for sensing the temperature of the oil when said engine is in operation;

means connected to said sensing means for accumulating the time the engine is in operation at a temperature that is outside a predetermined range of temperatures;

means for notifying an engine operator whenever the actual time the oil remains in the engine exceeds a first predetermined period of time, whenever the engine run time exceeds a second predetermined period of time that is less than first predetermined period of time, and whenever the engine is sensed to have been operated outside said predetermined range of temperatures for a third accumulated period of time that is less than said first and second predetermined periods of time.

8. An apparatus for determining when the lubricating oil in an internal combustion engine has been used to a point that the oil requires changing, comprising:

first resettable means for accumulating the actual time the oil has remained in the engine since the last oil change;

second resettable means for accumulating the time the engine has been operated since the last oil change;

means for sensing the temperature of the oil when said engine is in operation;

third resettable means connected to said sensing means for accumulating the time the engine has been operated since the last oil change at temperatures that are outside a predetermined range of temperatures;

means for notifying an engine operator whenever the actual time the oil remains in the engine exceeds a first predetermined period of time, whenever the engine operation time accumulation exceeds a second predetermined period of time that is less than first predetermined period of time, and whenever the engine is sensed to have been operated outside said predetermined range of temperatures for a third accumulated period of time that is less than said first and second predetermined periods of time.

9. An apparatus as in claim 7, wherein said first, second and third means are resettable to predetermined initial values when said oil is changed.

10. An apparatus as in claim 8, further including means for periodically comparing the accumulated time in said third means with the accumulated time in said second means, and said notifying means also functions whenever the comparing means indicates that the engine has been operated outside the predetermined range of temperatures for at least a predetermined percentage of its accumulated operation time since the last oil change.

11. A method of determining when the lubricating oil in an internal combustion engine has been used to a point that it requires replacement, comprising the steps of:
 accumulating the actual time the oil remains in the engine between oil replacements;
 accumulating the time the engine is in operation between oil replacements;
 sensing the temperature of the oil when said engine is in operation;
 accumulating the time the engine is in operation at a temperature that is outside a predetermined range of temperatures;
 notifying an engine operator whenever the actual time the oil remains in the engine exceeds a first predetermined period of time, whenever the engine operation time accumulation exceeds a second predetermined period of time that is less than first predetermined period of time, and whenever the engine is sensed to have been operated outside said predetermined range of temperatures for a third accumulated period of time that is less than said first and second predetermined periods of time.

12. A method of determining when the lubricating oil in an internal combustion engine has been used to a point that it requires replacement, comprising the steps of:
 accumulating the actual time the most recently changed oil has remained in the engine;
 accumulating the time the engine has been operated since the last oil change;
 sensing the temperature of the oil when said engine is in operation;
 accumulating the time the engine has been sensed as having been in operation since the last oil change at temperatures that are outside a predetermined range of temperatures;
 notifying an engine operator whenever the actual time the oil remains in the engine exceeds a first predetermined period of time, whenever the engine operation time exceeds a second predetermined period of time that is less than first predetermined period of time, and whenever the engine is sensed to have been operated outside said predetermined range of temperatures for a third accumulated period of time that is less than said first and second predetermined periods of time.

13. A method as in claim 12, further including the step of comparing the engine operation time accumulation outside the predetermined temperature range with the engine operation time accumulation, and notifying said engine operator whenever the comparing step indicates that the engine has been operated outside the predetermined range of temperatures for at least a predetermined percentage of its operation time accumulation since the last oil change.

14. A method as in claim 13, wherein said step of accumulating the time said engine is operating outside said predetermined range of temperatures includes the steps of accumulating the time said engine is operating at temperatures below said predetermined range as a low temperature time, and accumulating the time said engine is operating at temperatures above said predetermined range as a high temperature time.

15. A method as in claim 14, wherein said step of comparing includes the step of comparing said low temperature time with the engine operation time accumulation, and said step of notifying said engine operator is also performed whenever the comparing step indicates that the engine has been operated below the predetermined range of temperatures for at least a predetermined percentage of its accumulated operation time since the last oil change.

* * * * *